April 21, 1953 G. A. SCHWAB 2,635,340
DUPLICATOR

Filed Sept. 12, 1951 2 SHEETS—SHEET 1

INVENTOR.
George A. Schwab
BY
John P. Hanrahan
ATTORNEY

April 21, 1953        G. A. SCHWAB        2,635,340
DUPLICATOR
Filed Sept. 12, 1951        2 SHEETS—SHEET 2
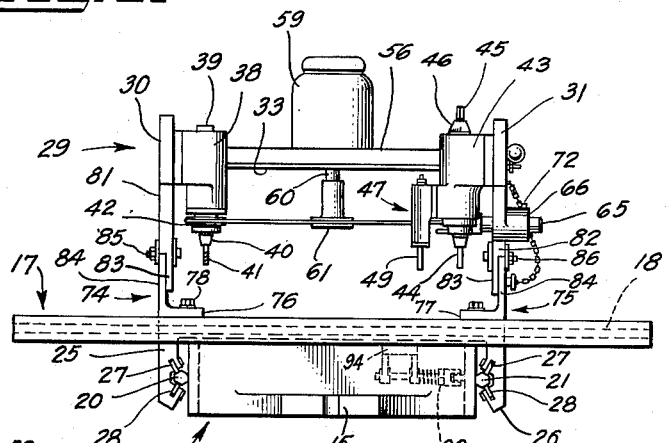
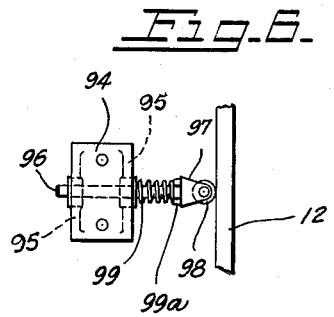
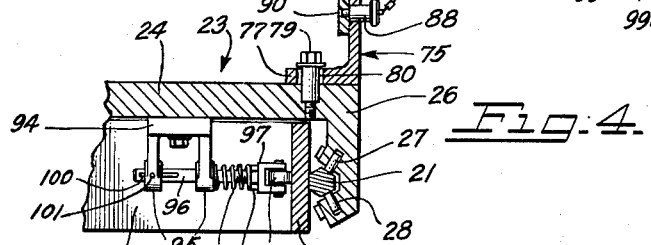
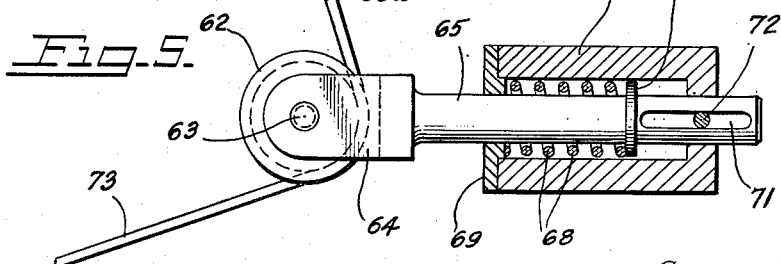
INVENTOR.
George A. Schwab
BY
John J. Hanrahan
ATTORNEY Patented Apr. 21, 1953

2,635,340

UNITED STATES PATENT OFFICE 2,635,340

DUPLICATOR

George A. Schwab, Fairfield, Conn.

Application September 12, 1951, Serial No. 246,304

4 Claims. (Cl. 33—23)

This invention relates to new and useful improvements in machines and has particular relation to a machine for duplicating difficult forms or designs in various materials as, metal, plastics, etc.

An object of the invention is to provide a machine for the purpose specified and including means whereby the machine is readily adapted for use of various sizes of cutters for light or heavy cuts.

Another object is to provide a machine of the character indicated and including means adapting the machine to provide the "feel" or "touch" best suited or liked by each individual or operator.

A further object is to provide a machine having the features indicated and which is readily adapted for the operation known as "quilling."

Yet another object is to provide a machine for the purpose set forth and which includes an improved structure of mounting of the movable parts, an improved drive structure, which may be used as either a bench or pedestal type machine, which may be mounted on a milling machine or the like for the accomplishment of certain work by such milling machine or the like and can be used for its normal functions to complete work while yet mounted on said milling machine or the like, and which may also be used as a profiler.

Other objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 3 is a front elevational view thereof;

Fig. 4 is a vertical detail sectional view, on a larger scale, and taken as along the plane of the line 4—4 of Fig. 1;

Fig. 5 is an enlarged detail sectional view showing a loaded pulley mounting for maintaining taut at all times a driving belt between the motor and cutting tool of the machine;

Fig. 6 is a detail plan view of a friction means for resisting free movements of a carriage; and Fig. 7 is a detail sectional view, enlarged, showing a feeler device.

Figure 1:
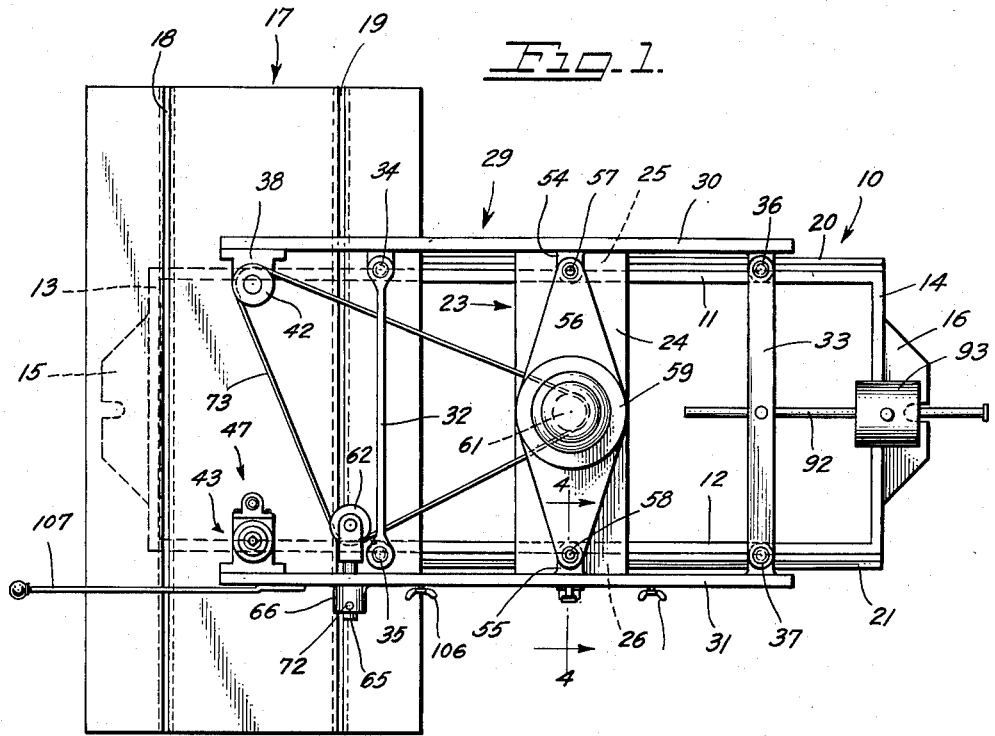
Fig. 1 is a top plan view of my duplicator.
Figure 2:
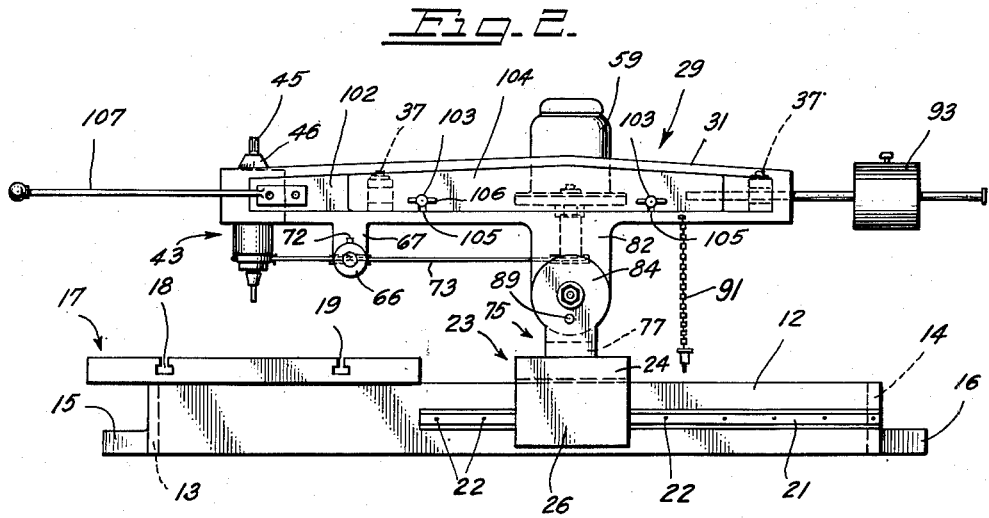
Fig. 2 is a side elevational view thereof.

Referring in detail to the drawings, at 10 is generally indicated a base or supporting structure shown as in the form of a hollow rectangular frame including sides 11 and 12, a forward end 13 and a rear end 14. If desired, this supporting structure 10 may be solid structure rather than the frame described, although as a general rule the described frame may be made heavy enough for all practical purposes.

End members 13 and 14 have formed therewith mounting ears 15 and 16 for use in mounting the described supporting structure on a bench or on the table of a milling machine, etc. While the above implies that the present structure is a bench type machine and it is disclosed as such, it will be understood that the frame structure 10 may be part of a pedestal should a pedestal type of machine be wanted.

On the forward portion of structure 10 is a work holder 17 shown as a relatively heavy large size plate having T-slots 18 and 19 for use in clamping work thereto. On the outer sides of the rear portions of the sides 11 and 12 of the frame 10 are ways 20 and 21. Such ways in the present disclosure comprise rods which are hexagonal in transverse section and the rods are secured against the outer surfaces of the sides 11 and 12 by screws or other means 22 having their heads countersunk into the rods.

Straddling the rectangular supporting structure or base 10 is a carriage generally designated 23 and which is in the form of a shallow inverted U comprising a connecting portion 24 and depending side arms 25 and 26. Such side arms span the ways or rails 20 and 21 and each such side arm carries a pair of rollers 27 and 28 rolling against a pair of the surfaces of the hexagonal rails or ways whereby the carriage 23 is mounted on the rails and is constrained against movement except forwardly thereon toward the work holder 17 and rearwardly thereon from such work holder.

Supported from the upper side of carriage 23 and movable therewith as the carriage is moved along the ways 20 and 21 and also movable relative to the carriage, as will be explained, is a frame generally designated 29. Frame 29 is a pantograph structure and comprises forwardly and rearwardly extending parallel members 30 and 31 and a pair of spaced rigid links 32 and 33 extending between forward and rearward portions of the members 30 and 31. Link 32 is pivotally connected at its respective ends to the members 30 and 31 as by vertical pivot pins 34 and 35 while link 33 is similarly connected with the members 30 and 31 by vertical pivot pins 36 and 37.

A bearing structure 38 on the forward end portion of member 30 mounts a vertical spindle 39 at its lower end carrying a collet or tool holder 40 to mount a tool 41. On said spindle, above the tool holder 40, is a pulley 42, the purpose of which will be set forth. Here it will be clear that as the member 30 and thus the frame 29 is moved, the bearing 38 and thus the tool 41 will be moved with it.

On the forward end portion of the frame member 31 is a housing structure 43 through which extends means supporting at its lower end a stylus 44 and the above described means includes a threaded shaft 45 which may be adjusted up and down in relation to a nut 46 or through the instrumentality of a nut 46 with which it threads, the structure being adapted for micrometer adjustments of the stylus 44 toward and from the work holder.

Associated with the stylus 44 and thus mounted on the housing 43 is a feeler device generally designated 47 and (see Fig. 7) comprising a housing 48 through which extends a feeler pin 49. Within the housing is a coil spring 50 surrounding the pins at its upper end against a wall 51 and at its lower end against a washer or stop 52 of the pin 49. A nut 53 on the upper end portion of the pin and engaging the upper end of the housing 48 limits the extent to which the pin may be projected but does not interfere with the upward movement of the pin due to pressure against the lower end of the pin and which upward movement results in compression of the spring 50. The purpose of this feeler structure will be made clear in the description of the operation of the present machine.

Approximately midway between the links 32 and 33 the members 30 and 31 on their inner sides are formed with ears 54 and 55 respectively, and a motor plate 56 extending between these ears has its end portions pivoted to them by vertically extending pivot means 57 and 58, respectively. Motor plate 56 midway its ends supports a motor 59 having its depending shaft 60 mounting and driving a pulley 61 located in the plane of the pulley 42 previously mentioned. A spring loaded takeup pulley 62 is mounted on a shaft or pivot 63 and is located between the arms 64 of a yoke structure which latter includes a stem portion 65 passing longitudinally through a housing 66 secured against the outer side of a depending ear 67 carried by the member 31.

Within the housing 66 a compression spring 68 surrounds the stem 65 and bears at one end against the housing closure 69 and at its other end against an enlargement 70 rigid with the stem portion 65. Outwardly of the washer or enlargement 70, stem portion 65 is provided with a longitudinally extending slot 71 through which passes a pin 72, the purpose of which is to prevent said stem portion from rotating about its own axis and thus the pin maintains the pulley 62 in a horizontal position.

Trained about the pulleys 62, 61 and 42 is an endless driving belt 73. This belt is driven by the motor 59 and serves to rotate the tool 41. Spring 68 is constantly urging the stem 65 outwardly through the housing 66 and thus through the pulley 62 is pulling on the belt 73 to maintain the latter taut.

A pair of L-shaped bracket members 74 and 75 have their shorter base portions 76 and 77 disposed against horizontally spaced portions of the upper surface of connecting portion 24 of carriage 23. Similar vertical pivot means 78 and 79 pivot said base portions 76 and 77 against and to the mentioned carriage portion but for turning movement thereto about the longitudinal axis of said pivots. As best shown in Fig. 4, bearing means 80 surround the pivot portions in the base portions of the bracket members 74 and 75.

Depending from the frame members 30 and 31 are ear-like portions 81 and 82 having lower end portions 83 overlapping with upper end portions 84 of the upstanding arm portions of the bracket members 74 and 75. Aligned horizontal pivots 85 and 86 pivotally connect the overlapping portions 83 and 84 of the ear 81 of member 31 and the upstanding arm of the bracket member 74 and the ear 82 in the upstanding arm of the bracket member 75, respectively. These horizontal pivoting means are aligned and they may be fixed in the mentioned arms of the bracket members 74 and 75 but are in bearings 87 in the depending overlapping portions 83 of the ears 81 and 82.

From the foregoing description it will now be understood that the carriage 23 when it is moved forwardly and rearwardly on the ways 20 and 21, will carry the frame 29 forwardly and rearwardly and thus carry the tool 41 and the stylus 44 forwardly and rearwardly over various portions of the work holder 17. Also, it will be understood that the entire frame structure including the bracket members 74 and 75 may be swung horizontally, said bracket members turning on the respective pivot 78 and 79. In addition, the frame structure may be rocked up and down about an axis represented by the centers of the pivots 85 and 86.

The frame may be locked in a horizontal position by inserting a captive locking pin 88 through an opening 89 in the upstanding arm of bracket member 75 and into an opening 90 in the depending ear portion 83 of the member 30 when such openings are in registry. On bringing these openings to registry, the frame 29 is horizontal and it is easily locked in that position by the insertion of the pin 88 as described. To prevent its loss, this pin is shown as attached to the frame member 31 by a chain 91. When the frame 29 is so locked against rocking movement about the mentioned horizontal axis, the machine is adapted for use as a profiler.

In the use of these machines, a great deal depends on the operator and different operators may use the same machine in slightly different manners depending on the "touch" or "feel" of various operators. To keep the frame 29 firmly balanced, if that is the wish of the operator, a rod 92 is fixed to the link 33 of the frame and such rod mounts a counterbalancing weight 93 adjustable longitudinally of the rod to bring the entire frame more into or more out of balance as may be best for any particular operator.

Additionally, to provide for the individuality of the operators, the feeler finger 49 is provided. It preferably projects slightly below the stylus 44 so as to engage the work first and then as the stylus is brought into engagement with the work this is only accomplished by forcing the feeler finger 49 upwardly against the tendency of the spring 50. Of course, such an action is necessary to bring the cutting tool 41 into engagement with the work, it being understood that the stylus 44 will be following the contours of a piece, which contours are to be duplicated in another piece by the tool 41. Rather than have the feeler pin 49 spring loaded, it may comprise part of a closed hydraulic system wherein movement of the finger inwardly displaces a fluid.

In addition to the above, a bracket 94 is secured against the underside of the connecting portion 24 of carriage 23 and this bracket has arms 95 through which pass a stem 96 at one end carrying a yoke 97 mounting a roller 98 riding against the inner face of the side 12 of supporting structure 10. A coil spring 99, bearing against bracket 94 and a nut 99a, is constantly urging the roller against said surface whereby to provide a resistance against free sliding movement of the carriage on the rails 20 and 21. Clearly, nut 99a may be threaded along the stem 96 to adjust the spring and the pressure with which the latter holds the roller against the side 12.

A slot 100 in the stem 96 and a pin 101 carried by one of the bracket arms 95 and passing through said slot holds said stem and thereby the roller 98 against turning movement about the longitudinal axis of the stem. Thus, the spring loaded roller 98 provides additional means giving the machine a "feel" since it avoids any free forward or rearward sliding movement of the carriage.

For light work it is desirable that the frame 29 be of light weight and easy to manipulate. However, when heavy cuts are to be made by the tool, it is desirable that more weight be available in the frame to restrict any tendency it might have toward up and down or other free movement. To this end, the frame members 30 and 31 are provided with grooves 102 in their outer surfaces and are also provided with nut carrying studs 103 and elongated weights 104 having slots 105 opening through their lower ends to accommodate the studs 103 are provided. These weights 104 are simply slipped over the studs 103 and then nuts 106 may be tightened against the weights so that they have no free movement relative to the frame. In this way, the frame may be made heavier and steadier, not only for use when the tool makes a heavy cut but also to eliminate all possible vibration. In most instances, whether or not weight is added, the amount of the weight added will depend on the size of cutter 41 being used.

When using the machine, the frame 29 and parts carried thereby are balanced about a horizontal pivot and are mounted on the slide for back and forth movement and are also laterally movable about the vertical pivots 78 and 79 and thus the stylus and the cutter may readily follow any movement permitted by pressure of the stylus against the model being copied. The weight of the members 30 and 31 of the pantograph or frame is determined by the size of the cutter and the amount of material to be removed. Thus weights 104 are added or removed, depending upon whether a heavy cutter is being employed for heavy cuts or whether a small light cutter is being employed for light cuts. The proper weight prevents throwing or jumping.

For the removal of bulk or stock in the making of large dies or forms, a method of milling known as "quilling" may be used. This is accomplished by attaching to the frame member 31 an arm 107 which extends beyond the forward end of the machine which is to be used under the arm of the operator. This allows for the use of large milling cutters. After "hogging" the bulk of the stock out of the piece, the handle is removed and the machine is utilized by the operator grasping the machine in the vicinity of the housing 43 mounting the stylus 44.

It will be noted that the cutter is rather indirectly driven and thus considerable power may be applied to it and also I have provided means for maintaining the belt 73 taut, it being noted that on sidewise movement of the frame about the vertical pivots 78 and 79 there may be some movement of member 30 toward member 31.

For very heavy work, the present machine may be mounted on the bed of a vertical miller and heavy cuts made using the miller. Then for finishing the work, the miller bed may be lowered and the work finished without removing the present machine from the bed of the milling machine. In connection with the matter of getting into the machine the "feel" favored by individual operators, it will be understood that various strengths of springs 50 may be used and that, if desired, means may be provided for increasing or decreasing the tension of the spring 50.

Having thus set forth the nature of my invention, what I claim is:

1. In a machine of the character described, a supporting base, a work holder at the forward end of said base, a pair of horizontal transversely spaced parallel guide rails mounted on said base, a carriage having end portions and a horizontal connecting portion extending transversely across the upper side of said base, roller means carried by said end portions engaging said rails whereby said carriage is movable in longitudinal parallel relation along said rails toward and from the forward end of said base, cooperating means respectively carried by said carriage and said base constraining movement of said carriage except in longitudinal parallel relation to said rails, a pair of vertically fixed vertical pivot means carried by said connecting portion of said carriage, one adjacent each end, a pair of bracket members, each having a substantially horizontal base portion and an upstanding arm portion, said base portions being respectively pivotally mounted upon said vertical pivot means, horizontal pivot means respectively carried by said upstanding arm portions of said bracket members, a pantograph frame above said carriage and comprising a pair of parallel side members and spaced rigid links pivoted at their respective ends to said side members whereby the latter are maintained in parallel relation, said side members each having a mounting part pivotally mounted upon said horizontal pivot means of said bracket members, a motor carried by said pantograph frame, a tool at the forward end portion of one of said side members, means whereby said motor drives said tool, and a stylus on the forward end portion of the other of said side members.

2. In a machine of the character described, a supporting base having a pair of longitudinal outer sides, a work holder at the forward end of said base, a pair of horizontal transversely spaced parallel guide rails, one mounted on each of said outer sides, and each having longitudinally extending upper and lower track surfaces, a carriage having end portions respectively outwardly of said rails and a horizontal connecting portion extending transversely across the upper side of said base, roller means carried by said end portions respectively engaging the upper track surfaces of said rails whereby said carriage is movable along said rails toward and from the forward end of said base, other roller means respectively engaging the lower track surfaces of said rails and constraining movement of said carriage except in longitudinal parallel relation to said rails, a pair of vertical pivot means carried by said connecting portion of said carriage, one adjacent each end, a pair of bracket members, each having a substantially horizontal base portion and an upstanding arm portion, said base portions being respectively pivotally mounted upon said vertical pivot means, horizontal pivot means respectively carried by said upstanding arm portions of said bracket members, a pantograph frame above said carriage and comprising a pair of parallel side members and spaced rigid links pivoted at their respective ends to said side members whereby the latter are maintained in parallel relation, said side members each having a mounting part pivotally mounted upon said horizontal pivot means of said bracket members, a motor carried by said pantograph frame, a tool at the forward end portion of one of said side members, means whereby said motor drives said tool, and a stylus on the forward end portion of the other of said side members.

3. In a machine of the character described, a supporting base having a pair of longitudinal outer sides, a work holder at the forward end of said base, a pair of horizontal transversely spaced parallel guide rails, one mounted on each of said outer sides, and each having longitudinally extending upper and lower track surfaces, said lower track surfaces being transversely inclined downwardly and inwardly, a carriage having end portions respectively outwardly of said rails and a horizontal connecting portion extending transversely across the upper side of said base, roller means carried by said end portions respectively engaging the upper track surfaces of said rails whereby said carriage is movable along said rails toward and from the forward end of said base, other roller means respectively engaging the lower track surfaces of said rails and constraining movement of said carriage except in longitudinal parallel relation to said rails, the axes of said other rollers being transverse and parallel to said lower track surfaces, a pair of vertical pivot means carried by said connecting portion of said carriage, one adjacent each end, a pair of bracket members, each having a substantially horizontal base portion and an upstanding arm portion, said base portions being respectively pivotally mounted upon said vertical pivot means, horizontal pivot means respectively carried by said upstanding arm portions of said bracket members, a pantograph frame above said carriage and comprising a pair of parallel side members and spaced rigid links pivoted at their respective ends to said side members whereby the latter are maintained in parallel relation, said side members each having a mounting part pivotally mounted upon said horizontal pivot means of said bracket members, a motor carried by said pantograph frame, a tool at the forward end portion of one of said side members, means whereby said motor drives said tool, and a stylus on the forward end portion of the other of said side members.

4. In a machine of the character described, a supporting base, a work holder at the forward end of said base, a pair of horizontal transversely spaced parallel guide rails mounted on said base, a carriage having end portions and a horizontal connecting portion extending transversely across the upper side of said base, roller means carried by said end portions engaging said rails whereby said carriage is movable in longitudinal parallel relation along said rails toward and from the forward end of said base, cooperating means respectively carried by said carriage and said base constraining movement of said carriage except in longitudinal parallel relation to said rails, a pair of vertically fixed vertical pivot means carried by said connecting portion of said carriage, one adjacent each end, a pair of bracket members, each having a substantially horizontal base portion and an upstanding arm portion, said base portions being respectively pivotally mounted upon said vertical pivot means, horizontal pivot means respectively carried by said upstanding arm portions of said bracket members, a pantograph frame above said carriage and comprising a pair of parallel side members and spaced rigid links pivoted at their respective ends to said side members whereby the latter are maintained in parallel relation, said side members each having a mounting part pivotally mounted upon said horizontal pivot means of said bracket members, a motor carried by said pantograph frame positioned between said side members with its central axis substantially coincident to a plane extending through said vertical and horizontal pivot means, a tool at the forward end portion of one of said side members, means whereby said motor drives said tool, and a stylus on the forward end portion of the other of said side members.

GEORGE A. SCHWAB.

References Cited in the file of this patent

UNITED STATES PATENTS

| Number | Name | Date |
|---|---|---|
| 940,730 | Roovers | Nov. 23, 1909 |
| 1,118,729 | Bock | Nov. 24, 1914 |
| 1,721,015 | Galbraith | July 16, 1929 |
| 1,893,957 | Parten | Jan. 10, 1933 |
| 2,185,011 | Anderson | Dec. 26, 1939 |
| 2,330,035 | D'Zimba | Sept. 21, 1943 |

FOREIGN PATENTS

| Number | Country | Date |
|---|---|---|
| 5,635 | Great Britain | 1908 |